Figure 1:
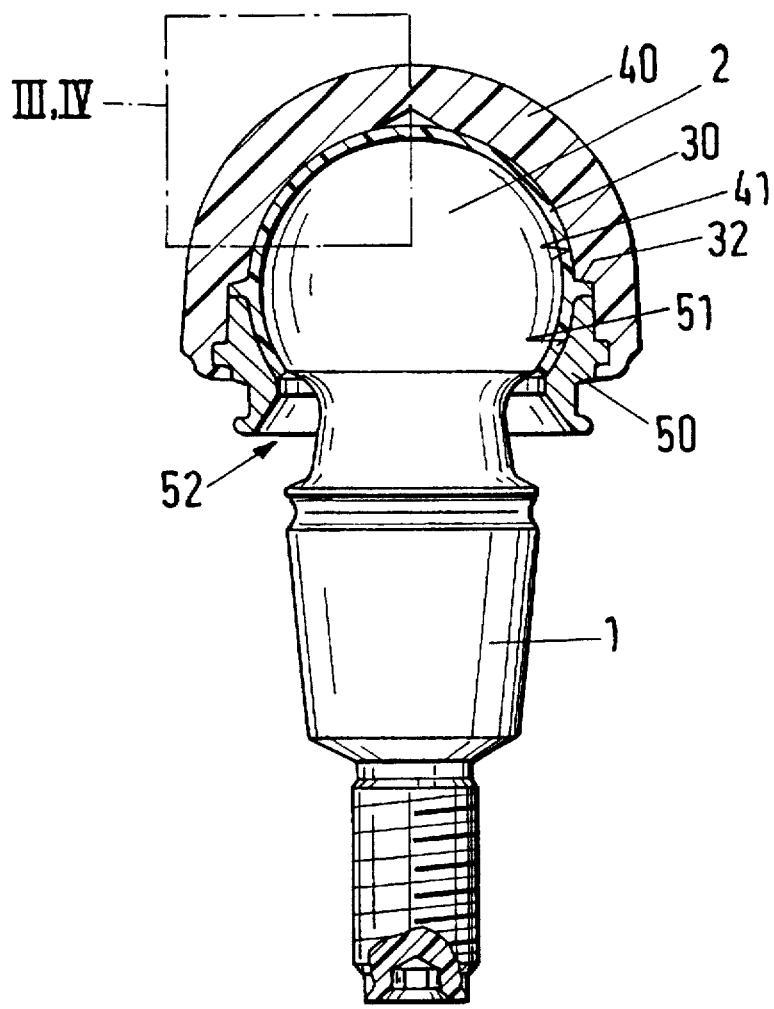

United States Patent [19]

Henkel

[11] Patent Number: 5,782,574
[45] Date of Patent: Jul. 21, 1998

[54] BALL AND SOCKET JOINT

[75] Inventor: Günther Henkel, Düsseldorf, Germany

[73] Assignee: TRW Fahrwerkesysteme GmbH & Co., Alfdorf, Germany

[21] Appl. No.: 724,037

[22] Filed: Sep. 23, 1996

Related U.S. Application Data

[63] Continuation of Ser. No. 339,078, Nov. 14, 1994, abandoned.

[30] Foreign Application Priority Data

Nov. 15, 1993 [DE] Germany ............... 43 38 916.3

[51] Int. Cl.$^6$ .................................................. F16C 11/00
[52] U.S. Cl. .................... 403/135; 403/122; 403/133; 403/140
[58] Field of Search ............................. 403/122, 133, 403/134, 135, 140

[56] References Cited

U.S. PATENT DOCUMENTS

| | | | |
|---|---|---|---|
| 3,574,368 | 4/1971 | Songer | 403/135 X |
| 3,856,423 | 12/1974 | Uchida | |
| 4,577,988 | 3/1986 | Gollub et al. | 403/140 |
| 4,904,107 | 2/1990 | Furukawa et al. | 403/122 |
| 4,971,473 | 11/1990 | Schafer et al. | |
| 5,188,476 | 2/1993 | Mori | |
| 5,509,748 | 4/1996 | Idosako et al. | 403/122 X |
| 5,549,700 | 8/1996 | Graham et al. | 403/133 X |

FOREIGN PATENT DOCUMENTS

| | | | |
|---|---|---|---|
| 621418 | 8/1962 | Belgium | 403/133 |
| 0355537 | 2/1990 | European Pat. Off. | |
| 0541488 | 5/1993 | European Pat. Off. | |
| 2216853 | 8/1974 | France | |
| 3326960 | 2/1985 | Germany | |
| 3326960C3 | 9/1985 | Germany | |
| 3823777 | 11/1989 | Germany | |
| 3823777C1 | 11/1989 | Germany | |
| 9112053 | 1/1992 | Germany | |
| 4212346 | 11/1992 | Germany | |
| 52-66879 | 9/1977 | Japan | |
| 56-10 | 1/1981 | Japan | |
| 58-146714 | 9/1983 | Japan | |
| 63-168318 | 11/1988 | Japan | |
| 552212 | 3/1993 | Japan | |
| 99822 | 1/1954 | Netherlands | 403/140 |

*Primary Examiner*—Daniel P. Stodola
*Assistant Examiner*—Bruce A. Lev
*Attorney, Agent, or Firm*—Tarolli, Sundheim, Covell, Tummino & Szabo

[57] ABSTRACT

A ball-and-socket joint for motor vehicles with a lining (30) consists of an elastic plastic material that is inserted between a socket (40) and a ball (2) of a rotatable or tiltable ball-ended shaft (1) and braced in the socket (40) with its outer surface, whereby lubricating pockets (6) are formed on the inner side of the lining (30) under the influence of a joint prestress or load. In order to lower the release torque while simultaneously improving the lubrication effect and extending the service life of the ball-and-socket joint, the surface of the lining (30) that adjoins the socket (40) is provided with a number of flat portions (34) or elevations (35) that, in the assembled state of the ball-and-socket joint, form lubricating pockets (6 or 7) on the inner side of the lining (30) that faces the smooth ball (2) due to the grease filling.

5 Claims, 3 Drawing Sheets

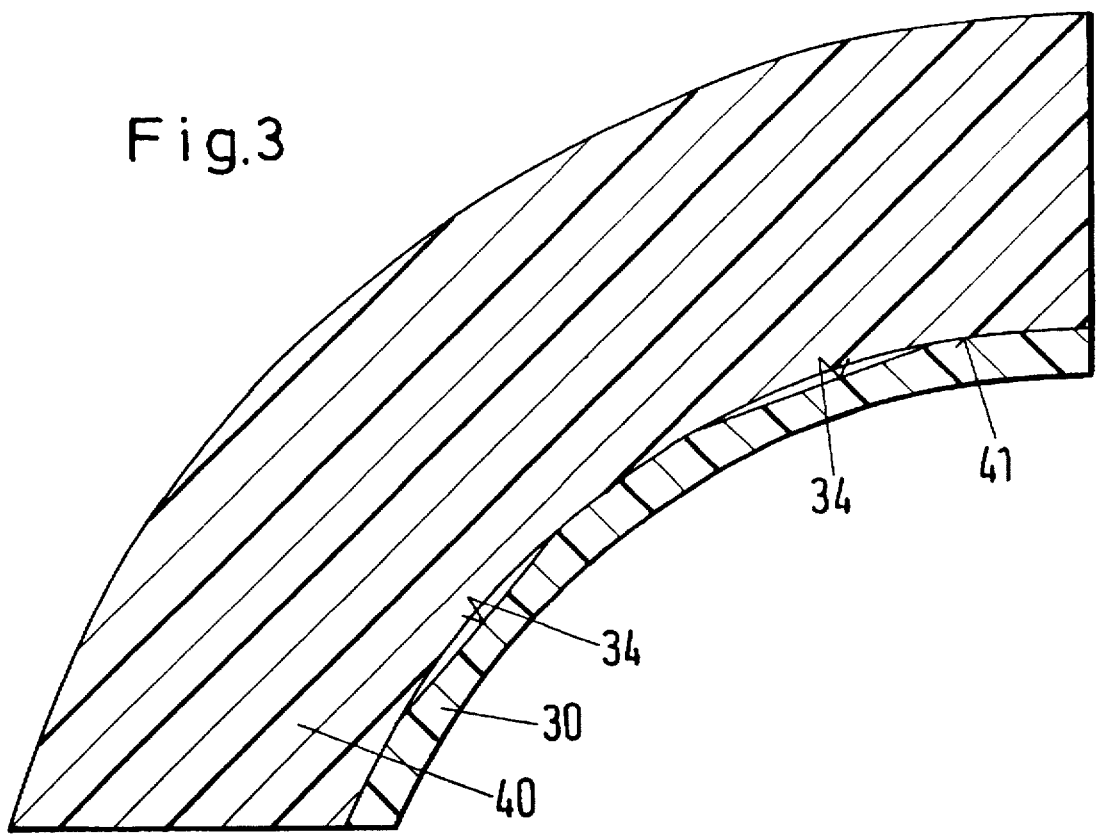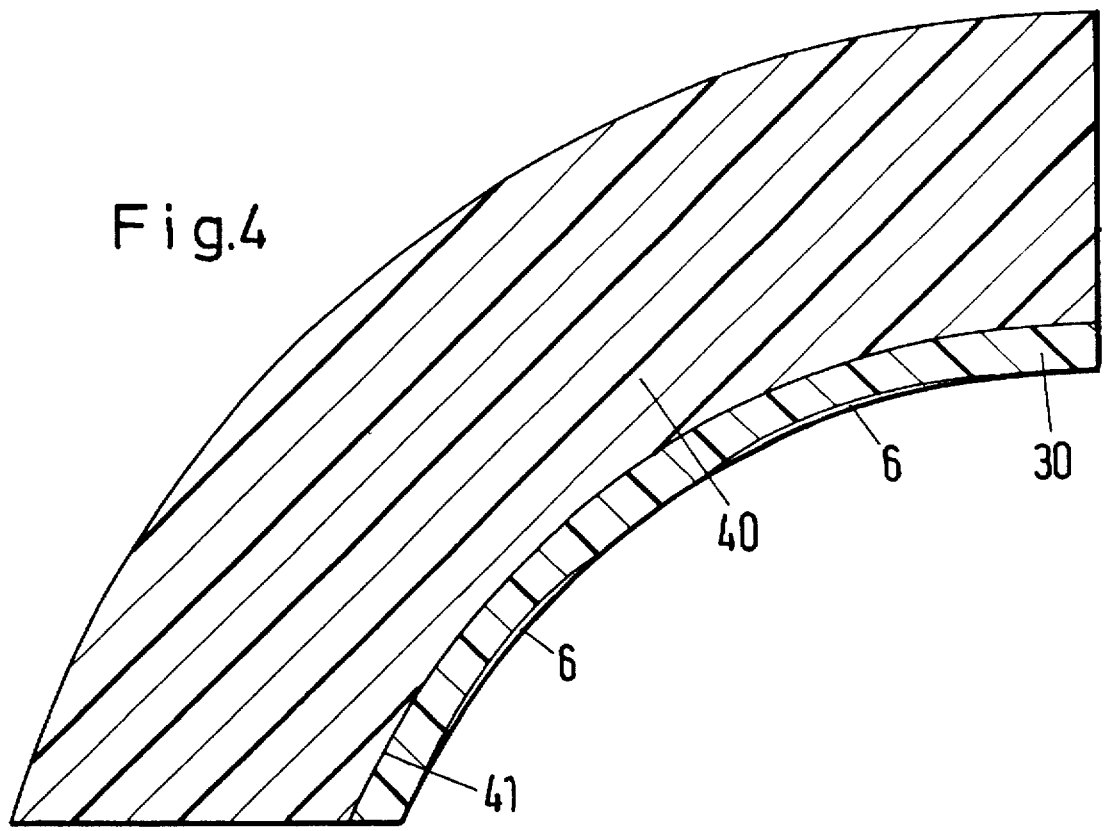

BALL AND SOCKET JOINT

This application is a continuation of application(s) Ser. No. 08/339,078 filed on Nov. 14, 1994, now abandoned.

The invention pertains to a ball-and-socket joint for motor vehicles with a lining consisting of an elastic plastic material inserted between a socket and a ball of a rotatable or tiltable ball-ended shaft and braced in the socket with its outer surface, whereby lubricating pockets are formed on the inner side of the lining under the influence of a joint prestress or load.

Ball-and-socket joints of this type are generally known. These ball-and-socket joints allow a rotation as well as tilting of the components connected with one another via the joint. The friction between the lining and the ball should be as low as possible, in particular if several such ball-and-socket joints interact with one another, e.g., in the wheel suspension of steerable front wheels.

German Patent No. 3,326,960 C3 discloses a ball-and-socket joint in which the lining consisting of an elastic plastic material is braced on the socket with its outer surface via ribs. Lubricating pockets that improve the lubrication of the ball-and-socket joint and consequently reduce the friction are formed on the inner side of the lining in the regions situated between the ribs under the influence of a joint prestress or load. German Patent No. 3,823,777 C1 also discloses a ball-and-socket joint of this type in which the lubricating pockets to be formed on the inner side of the lining are formed by ribs that are arranged on the outer side of the lining and extend transversely with respect to the joint axis in order to create an even tilting moment and torque.

The lubricating pockets formed by the ribs have a relatively large surface, so that the joint has an undesirable elasticity and a relatively high release torque is required for causing a relative movement between the ball and the lining. This high release torque is particularly unfavorable if a number of ball-and-socket joints interact with one another, e.g., in multisteering axles of motor vehicles. In addition, the intensity of the release torque and the friction created depend on the direction of movement of the ball relative to the ribs on the lining due to the longitudinal extent of the ribs. Known ribs have the additional disadvantage that their effect is only attained if strict manufacturing tolerances are observed, in particular the tolerances of the socket.

The invention is based on the objective of developing a ball-and-socket joint of the initially mentioned type in such a way that a lower release torque is attained while improving the lubrication and extending the service life.

According to the invention, these objectives are attained by the fact that the lining is provided with a number of flat portions or elevations that are distributed evenly over the surface of the lining that contacts the socket, and that the outer surface of the lining also contacts the socket within the region of the flat portions or outside the region of the elevations in the assembled condition of the ball-and-socket joint due to the grease filling and the elasticity of the plastic material of the lining such that lubricating pockets are formed on the inner side of the lining that faces the smooth ball.

The numerous flat portions or elevations form small lubricating pockets of defined shape, so that the intensity of the release torque is reduced and an undesirable elasticity of the joint is prevented. During movement of the ball relative to the lining, the lubricant flows from one lubricating pocket to the next lubricating pocket, so that a quasi-hydrodynamic lubrication is attained and the respective components slide in an almost frictionless fashion. The even distribution of the lubricating pockets formed by the flat portions not only insures a full surface lubrication that only requires a small quantity of lubricant, but also results in a low release torque that does not depend on the direction of movement.

According to one additional characteristic of the invention, the flat portions or elevations may be arranged in several rows on the degrees of longitude and latitude of the spherical surface. Depending on the design and the size of the lubricating pockets, with this type of distribution of the flat portions or elevations it is possible to realize either identical or intentionally different frictional forces and/or release torques in the rotating and tilting direction.

In one advantageous embodiment of the invention, a projecting collar, by means of which the lining is fixed on the socket in a nonpositive fashion by clamping, is arranged on the outer side of the lining. The clamping effect is realized by means of a clamp ring that holds the lining in the socket in an immovable fashion. In addition, the fixed lining adjoins the socket in a nonpositive fashion such that a direct transmission of the forces through the joint is made possible and an articulated connection without play is created. A simple assembly of the ball-and-socket joint is made possible due to the fact that the lining is clamped in its position by means of the locking ring.

It is preferred that the lining extend beyond the collar in the direction toward the ball-ended shaft in order to enlarge the lining surface, whereby the flat portions or elevations forming the lubricating pockets may also be extended in order to improve the lubrication.

Figure 2:
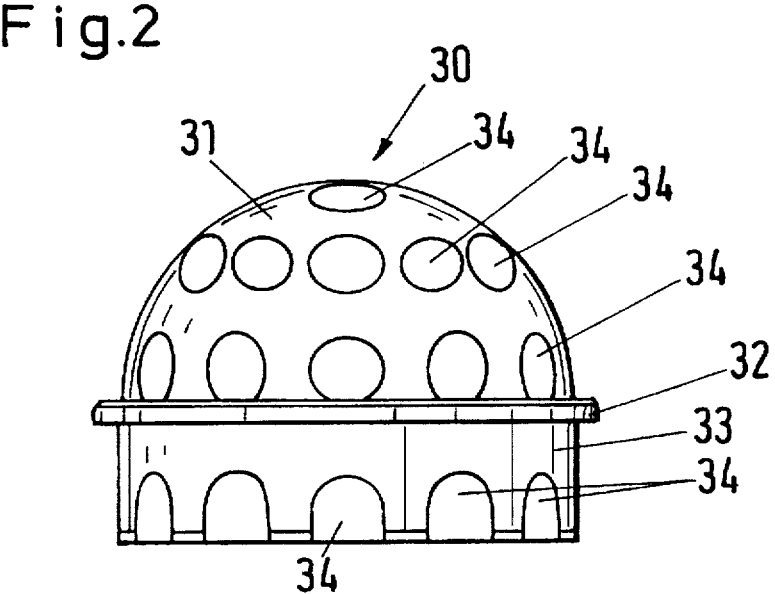
Figure 5:
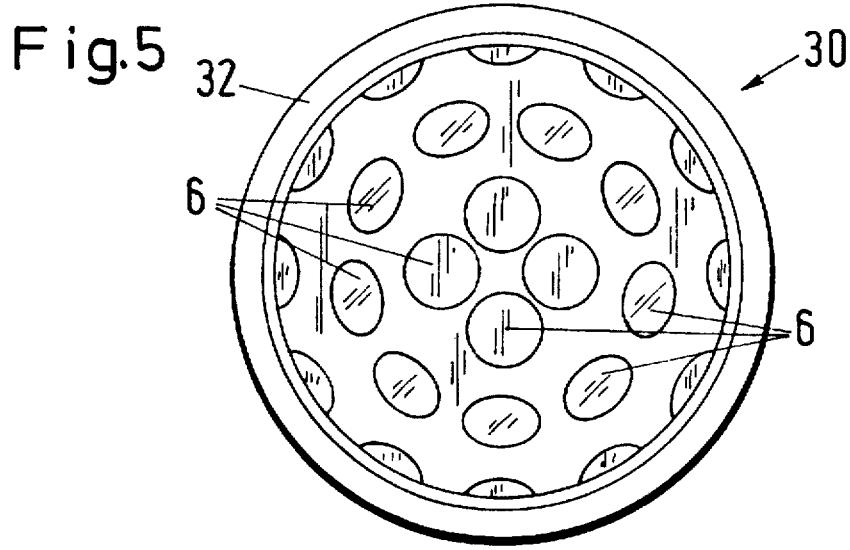
Figure 6:
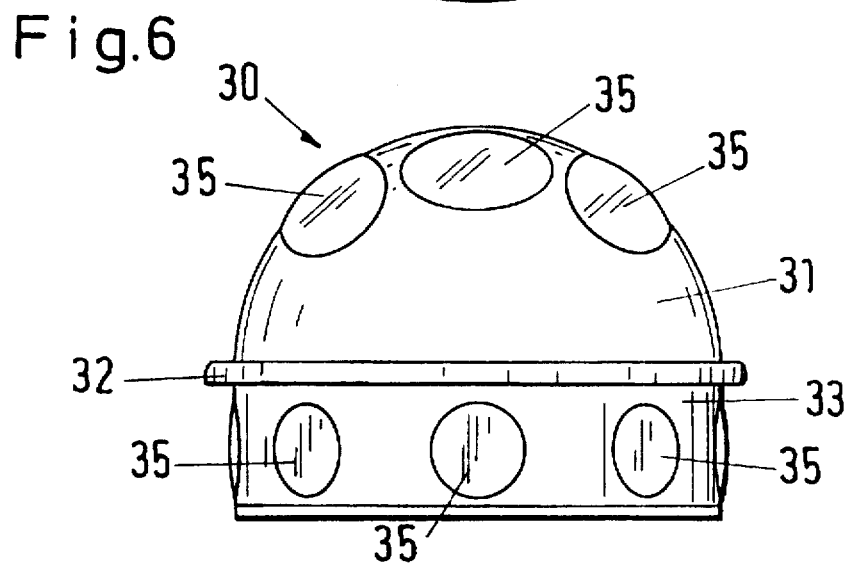

Two embodiments of the ball-and-socket joint according to the invention are illustrated in the figures. The figures show:

FIG. 1: a longitudinal section through a first embodiment of a ball-and-socket joint;

FIG. 2: a side view of the lining of the ball-and-socket joint according to FIG. 1;

FIG. 3: an enlarged partial section through the unstressed lining according to detail III in FIG. 1, which is inserted into a housing;

FIG. 4: an enlarged partial section through the stressed ball-and-socket joint according to detail IV in FIG. 1;

FIG. 5: a view into the stressed lining according to FIG. 4, which also shows the bearing pockets;

FIG. 6: a side view according to the illustration in FIG. 2 of a second embodiment of a lining;

and

Figure 7:
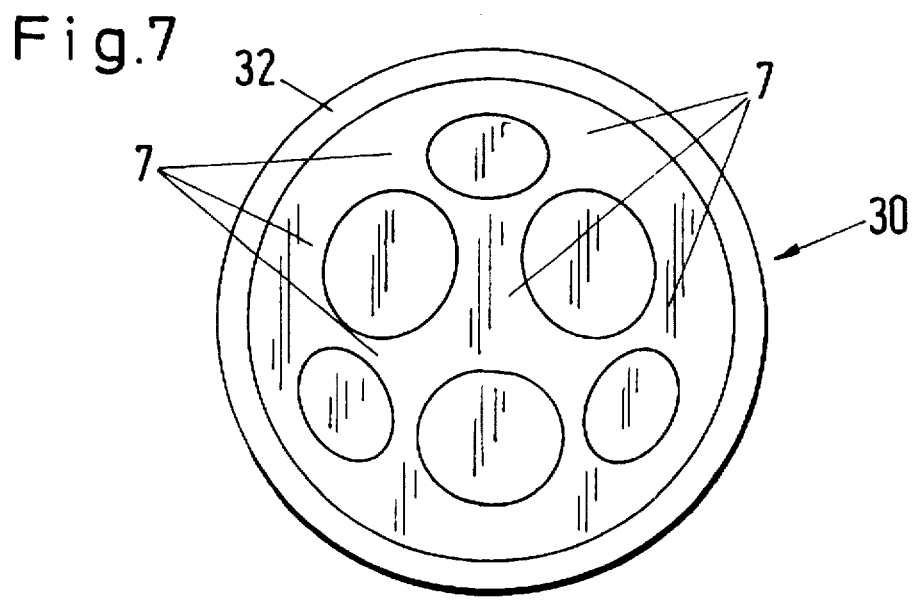

FIG. 7: a view according to the illustration in FIG. 5 into the stressed lining according to FIG. 6.

FIG. 1 shows a ball-and-socket joint with a ball-ended shaft 1, the ball 2 of which is inserted into a socket 40 by arranging a lining 30 in between the aforementioned elements. The socket 40 accommodates the lining 30 in a recess 41 that has the shape of a hemisphere. A locking ring 50, the inner surface 51 of which has the shape of a ball race that extends the recess 41 to form a spherical cap with an opening 52 for the ball-ended shaft 1, is inserted into the socket 40.

A side view of a first embodiment of the lining 30 inserted between the socket 40 and the ball 2 is shown in FIG. 2. The lining 30 comprises an approximately hemispherical upper part 31, a collar 32 situated adjacent to the upper part 31 as well as a cylindrical extension 33 situated adjacent to the collar. Flat portions 34 are provided on the surface of the upper part 31 as well as the extension 33 of the lining 30.

FIG. 3 shows more clearly that the flat portions 34 are designed like the base surface of universal ball joints in the form of tangential planes formed on the outer surface of the lining 30. FIG. 2 clearly indicates that the edge of each flat portion 34 has a circular shape. The flat portions 34 are arranged in several rows on the degrees of longitude and latitude of the spherical surface of the lining 30. One row of flat portions 34 is also arranged on the extension 33.

After assembling the ball-and-socket joint, the lining 30 that was inserted into the socket 40 is braced on said socket. The ball 2 is enclosed by the lining 30 by an angle of more than 180° because the elastic plastic material of the extension 33 is deformed into a ring segment of a universal ball joint by the inner surface 51 of the locking ring 50 as shown in FIG. 1. However, the shape of the locking ring 50 not only enlarges the contact surface between the ball 2 and the lining 30; the ball 2 is also accommodated in the socket 40 in a captive fashion. The lining 30 is fixed in the socket 40 in a nonpositive fashion by clamping because the collar 32 is enclosed between the socket 40 an d the locking ring 50. The extension 33 is dimensioned in such a way that it ends flush with the opening 52.

The lining 30 that is inserted into the socket 40 adjoins the recess 41 with its outer surface as shown in FIG. 3. The lining 30 only extends at a distance from the recess 41 within the region of the flat portions 34. The grease filling introduced into the ball-and-socket joint is compressed on the inner side of the lining 30 under the influence of a joint prestress or load, so that the elastic plastic material of the lining 30 is deformed in such a way that the outer surface of the lining 30 also adjoins the recess 41 within the region of the flat portions 34 and lubricating pockets 6 that are filled with grease are formed due to the flat portions 34 on the inner side of the lining 30, namely within the region of the upper part 31 a s well as the extension 33. These lubricating pockets 6 are identified by hatching in FIG. 5.

During movement of the ball 2 relative to the lining 30, the grease in each of the lubricating pockets 6 is entrained by the ball 2 and flows into the next lubricating pocket 6. This lubricating principle causes an almost frictionless sliding movement of the ball 2 in the lining 30. Due to the even distribution of the flat portions 34, the lubricating pockets 6 are also evenly distributed on the lining 30, so that a rotating movement as well as a tilting movement or a superposition of both movements carried out by the ball-ended shaft 1 leads to an even and reliable lubrication. The rotating movement of the ball-ended shaft 1 is entirely unconfined, while the tilting movement of the ball-ended shaft 1 in customary fashion is limited by the size of the opening 52.

In the second embodiment of the invention according to FIGS. 6 and 7, elevations 35 are arranged on the surface of the lining 30 instead of flat portions, whereby said elevations have a circular or oval shape. After installing the lining 30 into the socket 40 and inserting the ball 2, lubricating pockets 7 that extend between the elevations 35 arranged on the outer side of the lining 30 are formed on the inner side of the lining 30 if stress is applied to the ball-and-socket joint filled with grease. This results in a large surface region of lubricant between the ball 2 and the lining 30, whereby said large surface region is interrupted by defined bearing points which, in turn, are formed by the size and position of the elevations 35 as shown in FIG. 7.

List of Reference Numerals
1 ball-ended shaft
2 ball
30 lining
31 upper part
32 collar
33 extension
34 flat portion
35 elevation
40 socket
41 recess
50 locking ring
51 inner surface
52 opening
6 lubricating pocket
7 lubricating pocket Having described the invention, the following is claimed:

1. A ball-and-socket joint for use in a motor vehicle, said ball-and-socket joint comprising:

a socket having an inner surface;

a shaft having a ball on an end thereof;

a lining made of an elastic plastic material located between said ball and said inner surface of said socket, said lining having a hemispherical outer surface comprising projecting portions which engage said inner surface of said socket and interposed portions between said projecting portions; and grease between said ball and said lining;

said interposed portions of said outer surface of said lining being forced radially outward into engagement with said inner surface of said socket by said ball and said grease to form a plurality of lubricating pockets between said ball and said interposed portions of said lining, said hemispherical outer surface of said lining completely engaging said inner surface of said socket when said interposed portions are forced radially outward, said interposed portions of said outer surface which are forced radially outward into engagement with said inner surface being coextensive with said plurality of lubricating pockets;

said plurality of lubricating pockets providing said ball-and-socket joint with full surface lubrication as well as a low release torque.

2. A ball-and-socket joint as set forth in claim 1 wherein said interposed portions, prior to being forced radially outward, comprise a plurality of essentially circular flat spaced apart portions.

3. A ball-and-socket joint as set forth in claim 2 wherein said plurality of flat spaced apart portions are arranged in several rows on said lining.

4. A ball-and-socket joint as set forth in claim 1 further comprising a locking ring, said lining having a projecting collar which is clamped in said socket by said locking ring.

5. A ball-and-socket joint as set forth in claim 4 wherein said lining includes an extension extending from said collar toward said locking ring, said lining having lubricating pockets located in said extension.

* * * * *